(12) United States Patent
King et al.

(10) Patent No.: US 9,920,171 B1
(45) Date of Patent: Mar. 20, 2018

(54) CROSSLINKERS FROM BIORENEWABLE RESVERATROL

(71) Applicant: International Business Machines Corporation, Armonk, NY (US)

(72) Inventors: Scott B. King, Rochester, MN (US); Brandon M. Kobilka, Tucson, AZ (US); Joseph Kuczynski, North Port, FL (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/417,465

(22) Filed: Jan. 27, 2017

(51) Int. Cl.
*C08G 77/38* (2006.01)
*C08G 77/00* (2006.01)

(52) U.S. Cl.
CPC ............. *C08G 77/38* (2013.01); *C08G 77/80* (2013.01)

(58) Field of Classification Search
None
See application file for complete search history.

(56) References Cited

U.S. PATENT DOCUMENTS

| | | | |
|---|---|---|---|
| 2,587,295 A | 2/1952 | Doyle et al. | |
| 2,717,900 A | 9/1955 | Plueddemann et al. | |
| 3,206,415 A | 9/1965 | Horst et al. | |
| 4,045,602 A | 8/1977 | Sommer et al. | |
| 4,301,268 A | 11/1981 | Kropac | |
| 4,474,933 A | 10/1984 | Huber et al. | |
| 4,781,973 A | 11/1988 | Zotto | |
| 4,895,830 A | 1/1990 | Takeda et al. | |
| 5,861,467 A | 1/1999 | Bujanowski et al. | |
| 6,203,923 B1 | 3/2001 | Bansleben et al. | |
| 6,239,204 B1 | 5/2001 | Miura et al. | |
| 6,572,882 B1* | 6/2003 | Vercauteren | A61K 8/375 424/451 |
| 6,605,691 B1* | 8/2003 | Gross | C08G 75/045 525/204 |
| 6,809,231 B2 | 10/2004 | Edwards | |
| 7,670,686 B2 | 3/2010 | Chen et al. | |
| 2003/0149124 A1 | 8/2003 | Thommes et al. | |
| 2011/0217750 A1 | 9/2011 | Pandit et al. | |
| 2012/0184682 A1* | 7/2012 | Dasgupta | C07C 43/215 525/277 |
| 2012/0220749 A1* | 8/2012 | Dasgupta | C08G 75/28 528/226 |
| 2012/0295353 A1 | 11/2012 | Hong et al. | |
| 2013/0272755 A1 | 10/2013 | Takeuchi et al. | |

(Continued)

FOREIGN PATENT DOCUMENTS

| | | |
|---|---|---|
| CN | 105287320 A | 2/2016 |
| CN | 105473126 A | 4/2016 |
| WO | WO-2005/052019 A1 | 6/2005 |

OTHER PUBLICATIONS

AUS920160687US1, Appendix P; List of IBM Patent or Applications Treated as Related, Jun. 14, 2017, 2 pages.

(Continued)

*Primary Examiner* — Robert S Loewe
(74) *Attorney, Agent, or Firm* — Roy R. Salvagio; Robert R. Williams; Kennedy Lenart Spraggins LLP

(57) ABSTRACT

A process includes utilizing biorenewable resveratrol or a resveratrol-derived material as a bio-derived crosslinker to form a crosslinked polymeric material.

19 Claims, 13 Drawing Sheets

(56) References Cited

U.S. PATENT DOCUMENTS

| | | |
|---|---|---|
| 2014/0004251 A1 | 1/2014 | Pandit et al. |
| 2014/0037772 A1 | 2/2014 | Lien |
| 2014/0107350 A1 | 4/2014 | Nakamura et al. |
| 2014/0296425 A1 | 10/2014 | Tew et al. |
| 2014/0329958 A1 | 11/2014 | Lester et al. |
| 2014/0355173 A1 | 12/2014 | Odle et al. |
| 2015/0005247 A1 | 1/2015 | Chen et al. |
| 2015/0179357 A1 | 6/2015 | Ichinomiya et al. |
| 2016/0032043 A1* | 2/2016 | von Recum ............ C08G 65/38 523/400 |
| 2016/0194574 A1 | 7/2016 | Gross et al. |
| 2016/0284905 A1 | 9/2016 | Mitobe et al. |
| 2017/0121469 A1 | 5/2017 | Kobilka et al. |

OTHER PUBLICATIONS

Haimov, *Preparation, Characterization and Catalysis by Polyoxometalate-Synthetic Protein and Polyoxometalate-Protein Hybrid Assemblies*, Thesis, Sep. 2007, 93 pages, Weizmann Institute of Science, Rehovot, Israel, URL: https://lib-phdsl.weizmann.ac.il/Dissertations/Haimov_Adina.pdf.

Innocentive, *Cost-effective, Large-scale Production of Natural Leaf Alcohol (cis-3-hexenol)*, Product Challenge No. 9933857, innocentive.com (online), [accessed Nov. 17, 2016], 3 pages, URL: www.innocentive.com/ar/challenge/9933857.

IBM, *IBM Academy of Technology Top 10 Technical Themes 2016*, IBM.com (online), accessed Jan. 16, 2017, 2 pages, URL: http://www-03.ibm.com/ibm/academy/tech/tech.shtml.

Dlamini et al., *Effect of Cross-Linking Agent Chemistry and Coating Conditions on Physical, Chemical, and Separation Properties of PVA-Psf Composite Membranes*, Separation of Science and Technology, vol. 49, Issue 1, Jan. 2014, pp. 22-29, Taylor & Francis Online (tandfonline.com), URL: www.tandfonline.com/doi/full/10.1080/01496395.2013.813040?scroll=top&needAccess=true.

Tang et al., *Whiteness improvement of citric acid crosslinked cotton fabrics: H2O2 bleaching under alkaline condition*, Carbohydrate Polymers, vol. 147, Aug. 2016, pp. 139-145, PubMed.gov (online), National Center for Biotechnology Information, U.S. National Library of Medicine, Bethesda MD.

Zhao et al., *Organic Acids Can Crosslink Poly(ionic liquid)s into Mesoporous Polyelectrolyte Complex*, Electronic Supplementary Material (ESI) for Polymer Chemistry, Issue 4, Feb. 2013, pp. 2432-2435, Royal Society of Chemistry, London, UK.

European Coatings, *Renewable Pentaerythritol to Cut Carbon Footprint*, European-Coatings.com (online), Jun. 15, 2010, 1 pp., URL: www.european-coatings.com/Raw-materials-technologies/Raw-materials/Coatings.

Anonymous, *Cross-Linked Bio-Plasticized Polymer Compositions*, An IP.com Prior Art Database Technical Disclosure, IP.com (online), Oct. 17, 2011, 3 pp., URL: ip.com/IPCOM000211763.

Bender Analytical Holding B.V. et al.; *Cross-Linked Polymers and Implants Derived from Electrophilically Activated Polyoxazoline*, An IP.com Prior Art Database Technical Disclosure, IP.com (online), Mar. 19, 2012, 42 URL: ip.com/IPCOM/000216010.

Lee et al., *Polymer Nanodo-Hybridized Alkyl Silicon Oxide Nanostructures for Organic Memory Transistors with Outstanding High-Temperature Operation Stability*, Scientific Reports, 6:33863, DOI: 10.1038/srep33863, <https://www.ncbi.nlm.nih.gov/pmc/articles/PMC5050446/>, Published Oct. 5, 2016, 10 pages.

Gokmen, et al., *Porous polymer particles—A comprehensive guide to synthesis, characterization, functionalization, and applications*, Elsevier, Science Direct, Progress in Polymer Science, vol. 37, Issue 3, <https://webcache.googleusercontent.com/search?q=cache:hbxd4uQY3WAJ:https://pdfs.semanticscholar.org/ed87/e2fd4e12c9c586c31de29d125f3ac5907b72.pdf+&cd=2&hl=en&ct=clnk&gl=us>, Available online Jul. 23, 2011, 41 pages.

Agarwal et al., *Use of electrospinning technique for biomedical application*, Elsevier, Polymer, vol. 49, Issue 26, < http://www.sciencedirect.com/science/article/pii/S0032386108007994>, dated Dec. 8, 2008, 19 pages.

Schwarz et al., *Preparation of molecularly imprinted polymers for the selective recognition of the bioactive polyphenol, (E)-resveratrol*, Elsevier, Journal of Chromatography A, vol. 1218, Issue 16, Available Online Feb. 23, 2011, 7 pages.

Zhang et al., *Study on the preparation of genipin crosslinked chitosan microspheres of resveratrol and in vitro release*, Journal of Polymer Research, (2013) 20:175, Springer Science+Business Media Dordecht 2013, published online Jun. 10, 2013, 10 pages.

Kim et al., *Fabrication of PDMS Microlenses With Various Curvatures Using a Water-Based Molding Method*, Twelfth International Conference on Miniaturized Systems for Chemistry and Life Sciences, Oct. 2008, pp. 994-996, Royal Society of Chemistry (rsc.org) online, URL: www.rsc.org/binaries/LOC/2008/PDFs/Papers/335_1030.pdf.

Xiameter, *An Overview of Polydimethylsiloxane (PDMS) Fluids in the Environment*, Product Information, xiameter.com (online), [accessed Nov. 17, 2016], URL: www.xiameter.com/en/ExploreSilicones/Documents/95-725-01%20Overview%20of%20Polydimethylsiloxane%20Fluids.pdf.

Gelest, *Functional Silicone Reactivity Guide*, Product Brochure, Reactive Silicones: Forging New Polymer Links gelest.com (online), [accessed Nov. 17, 2016], p. 2, URL: www.gelest.com/wp-content/uploads/Goods-PDF-brochures-reactivesilicones.pdf.

Wikipedia, *Resveratrol*, wikipedia.org (online), accessed Jan. 17, 2017, 18 pages, URL: en.wikipedia.org/wiki/Resveratrol.

Holladay et al., Biorenewable Processes to Acrylic Acid, Abstract, Pacific Northwest National Laboratory (pnnl.gov) online, [accessed Nov. 17, 2016], 1 page, URL: iic.pnnl.gov/abstracts/nacs/o_109.pdf.

Myriant, *Broad Pipeline, Diverse Applications*, Product Pipeline, myrinat.com (online), [accessed Nov. 17, 2016], 1 page, URL: www.myriant.com/products/product-pipeline.cfm.

SGA Polymers, *Bio-Based Acrylic Acid Technology*, sgapolymers.com (online), [accessed Nov. 17, 2016], 1 page, URL: www.sgapolymers.com.

Chemical Processing, *Bio-based Route for Allyl Alcohols Beckons: Formic-acid-mediated reaction efficiently converts biomass-derived polyols*, chemicalprocessing.com (online), Jul. 2009, 2 pages, URL: www.chemicalprocessing.com/articles/2009/150/.

Sekab, *Chemistry for the Future*, sekab.com (online), [accessed Nov. 17, 2016], 1 page, URL: www.sekab.com/chemistry/.

Fawcett et al., *Phototunable Cross-Linked Polysiloxanes*, Macromolecules, vol. 48, No. 18, Sep. 2015, pp. 6499-6507, American Chemical Society (ACS) Publications, Washington, DC.

* cited by examiner

US 9,920,171 B1

CROSSLINKERS FROM BIORENEWABLE RESVERATROL

BACKGROUND

Polydimethylsiloxane (PDMS) is among the most widely used silicon-based polymers, and the most widely used organic silicon-based polymer. PDMS materials have a wide range of applications including contact lenses, medical devices, soft lithography processes, shampoos, caulking, and lubricants (among other alternatives). One reason for the wide-ranging applications for PDMS materials is the variety of ways in which the properties of PDMS may be controlled through polymer crosslinking. By employing PDMS and small organic molecules with different organic functional groups, many possibilities exist for different PDMS materials to be crosslinked in different ways.

SUMMARY

According to an embodiment, a process comprises utilizing biorenewable resveratrol or a resveratrol-derived material as a bio-derived crosslinker to form a crosslinked polymeric material.

According to another embodiment, a crosslinked polydimethylsiloxane (PDMS) material is disclosed. The crosslinked PDMS material is formed by a process that comprises chemically reacting a functionalized PDMS material with biorenewable resveratrol.

According to another embodiment, a crosslinked PDMS material is disclosed. The crosslinked PDMS material is formed by a process that comprises chemically reacting a functionalized PDMS material with a bio-derived crosslinker that is formed from biorenewable resveratrol.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

The present disclosure describes crosslinkers derived from the biorenewable molecule resveratrol (3,5,4'-trihydroxy-trans-stilbene) and methods of forming bio-derived crosslinkers from the biorenewable molecule resveratrol. The biorenewable molecule resveratrol may be extracted from plants, where it is produced in response to injury or when the plant is under attack by pathogens such as bacteria or fungi. In some cases, the biorenewable molecule resveratrol may be utilized as a bio-derived crosslinking material. In other cases, resveratrol may undergo one or more chemical reactions (e.g., with other biorenewable materials) to form alternative bio-derived crosslinking materials. Utilizing biorenewable resveratrol (or derivatives thereof) as a crosslinking material may increase the biorenewable content of a crosslinked polymeric material, such as a crosslinked polydimethylsiloxane (PDMS) material, for use in various applications.

The bio-derived crosslinkers of the present disclosure may be applied to PDMS (or other polymers) for different applications. Examples of alternative polymers include polyethylene (PE), polypropylene (PP), polycarbonate (PC), polyurethane (PU), or acrylics, among other alternatives. In some cases, curing may be performed during processing of a desired material, with a completely crosslinked polymer. In other cases, the crosslinkers may be mixed with PDMS but left in a partial or uncrosslinked state that can be left to crosslink upon addition to the PDMS for a particular desired application (e.g., a caulking or coating application, among other alternatives).

Figure 1:
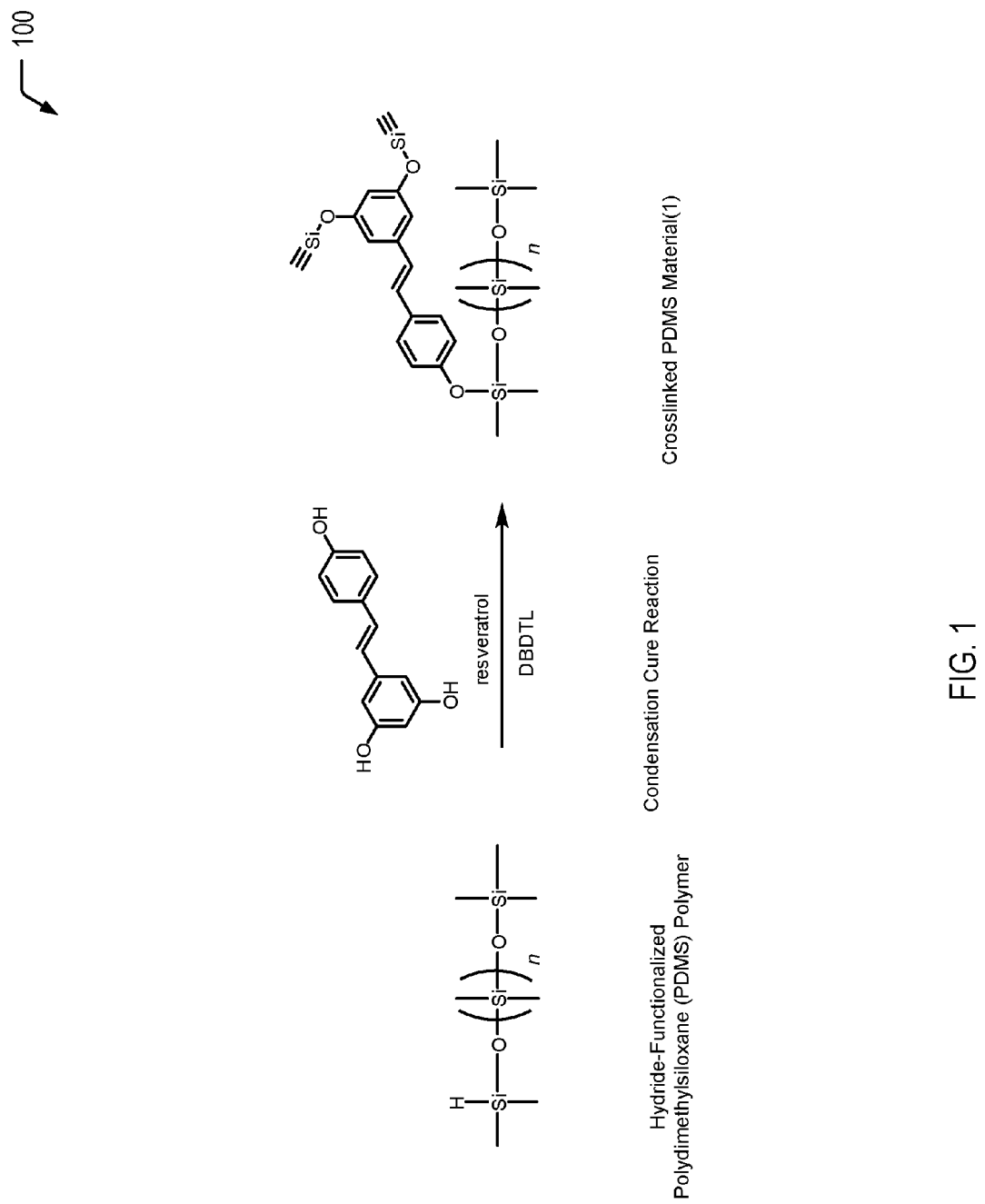
FIG. 1 is a chemical reaction diagram illustrating a process of forming a crosslinked PDMS material from the biorenewable molecule resveratrol, according to one embodiment.

Referring to FIG. 1, a chemical reaction diagram 100 illustrates a process of utilizing the biorenewable molecule resveratrol as a crosslinker to form a crosslinked polymeric material, according to one embodiment. In the particular embodiment depicted in FIG. 1, resveratrol (which may be derived from plants) is utilized as a crosslinker to form a crosslinked polydimethylsiloxane (PDMS) material (designated as "Crosslinked PDMS Material(1)" in FIG. 1). The crosslinked PDMS material illustrated in FIG. 1 may be formed via a chemical reaction (e.g., a condensation cure reaction) of the biorenewable resveratrol and a PDMS polymer.

FIG. 1 illustrates that resveratrol may be utilized as a bio-derived crosslinker to form a crosslinked polymeric material. FIG. 1 illustrates a particular embodiment of a condensation cure reaction that utilizes dibutyltin dilaurate (DBTDL) as a catalyst. FIG. 1 depicts an example in which all three hydroxyl groups of the resveratrol molecule react in the condensation cure reaction. Depending on the reaction conditions, all three hydroxyl groups may be used to crosslink the PDMS polymer or less than three hydroxyl groups may be used for crosslinking. To illustrate, by controlling the reaction conditions, catalyst type (other tin or platinum catalyst may be used), catalyst loading, and stoichiometry, a fraction of the hydroxyl groups (e.g., less than three hydroxyl groups per resveratrol molecule, on average) can be used for PDMS crosslinking. The ability to control the number of hydroxyl groups that react may enable better control of the mechanical properties of the final polymer.

As a prophetic example, a hydride-functionalized siloxane may be blended with resveratrol (about 1-20% w/w) and catalyst (DBDTL in this case, 0.1%-2.0% w/w) and mixed. The mixture may be applied to molds or coated onto a substrate and cured for times and temperatures that are appropriate for the desired applications.

Thus, FIG. 1 illustrates an example of a process of utilizing the biorenewable molecule resveratrol as a crosslinker to form a crosslinked polymeric material. Utilizing the biorenewable molecule resveratrol as a crosslinker may increase the biorenewable content of a resulting crosslinked polymeric material (e.g., a crosslinked PDMS material).

Figure 2:
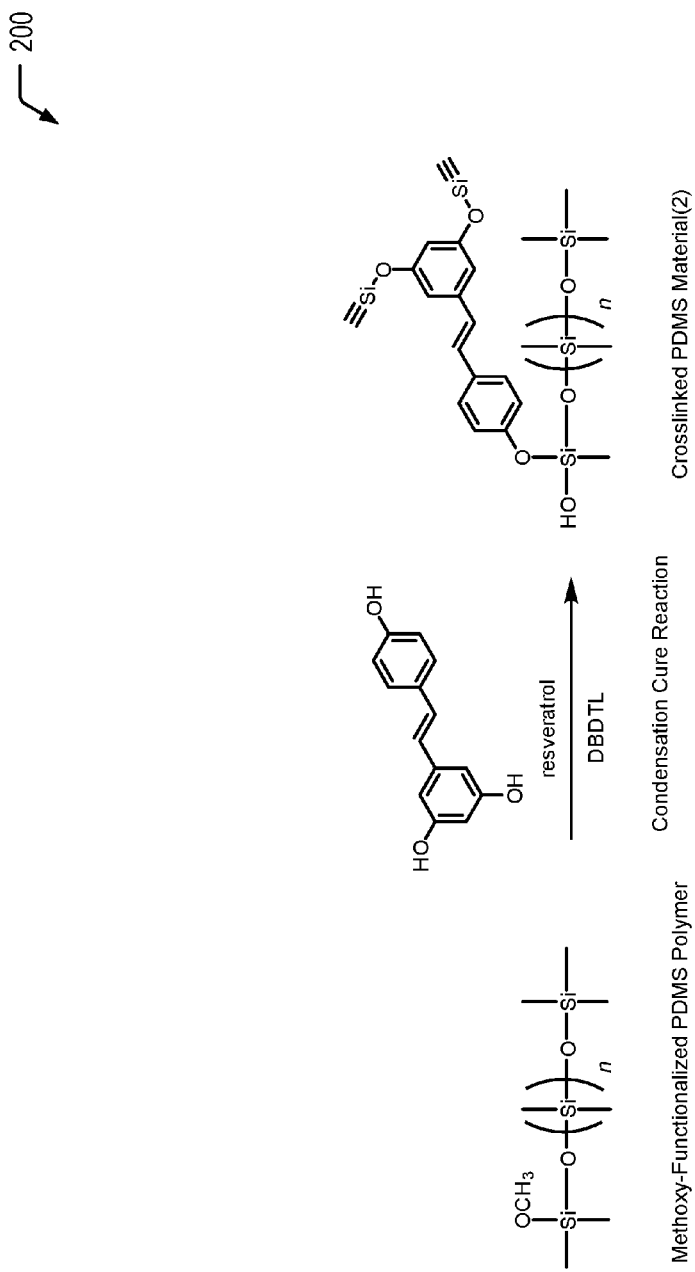
FIG. 2 is a chemical reaction diagram illustrating a process of forming a crosslinked PDMS material from the biorenewable molecule resveratrol, according to one embodiment.

Referring to FIG. 2, a chemical reaction diagram 200 illustrates a process of utilizing the biorenewable molecule resveratrol to form a crosslinked polymeric material, according to one embodiment. In the particular embodiment depicted in FIG. 2, the biorenewable molecule resveratrol is used to form a crosslinked PDMS material (designated as "Crosslinked PDMS Material(2)" in FIG. 2). The crosslinked PDMS material illustrated in FIG. 2 may be formed via a chemical reaction (e.g., a condensation cure reaction) of the biorenewable molecule resveratrol and an alkoxy-functionalized siloxane, such as a methoxy-functionalized siloxane.

FIG. 2 illustrates a particular embodiment of a condensation cure reaction that utilizes DBTDL as a catalyst. As a prophetic example, an alkoxy-functionalized siloxane (e.g., a methoxy-functionalized siloxane) may be blended with resveratrol (about 1-20% w/w) and catalyst (DBTDL in this case, 0.1%-2.0% w/w) and mixed. The mixture may be applied to molds or coated onto a substrate and cured for times and temperatures that are appropriate for the desired applications.

FIG. 2 depicts an example in which all three hydroxyl groups of the biorenewable resveratrol molecule react in the condensation cure reaction. Depending on the reaction conditions, all three hydroxyl groups may be used to crosslink the PDMS polymer or less than three hydroxyl groups may be used for crosslinking. To illustrate, by controlling the reaction conditions, catalyst type (other tin or platinum catalyst may be used), catalyst loading, and stoichiometry, a fraction of the hydroxyl groups (e.g., less than three hydroxyl groups per resveratrol molecule, on average) can be used for PDMS crosslinking. The ability to control the number of hydroxyl groups that react may enable better control of the mechanical properties of the final polymer.

Thus, FIG. 2 illustrates an example of a process of utilizing the biorenewable molecule resveratrol to form a crosslinked polymeric material. Utilizing the biorenewable molecule resveratrol as a crosslinker may increase the biorenewable content of a resulting crosslinked polymeric material (e.g., a crosslinked PDMS material).

Figure 9:
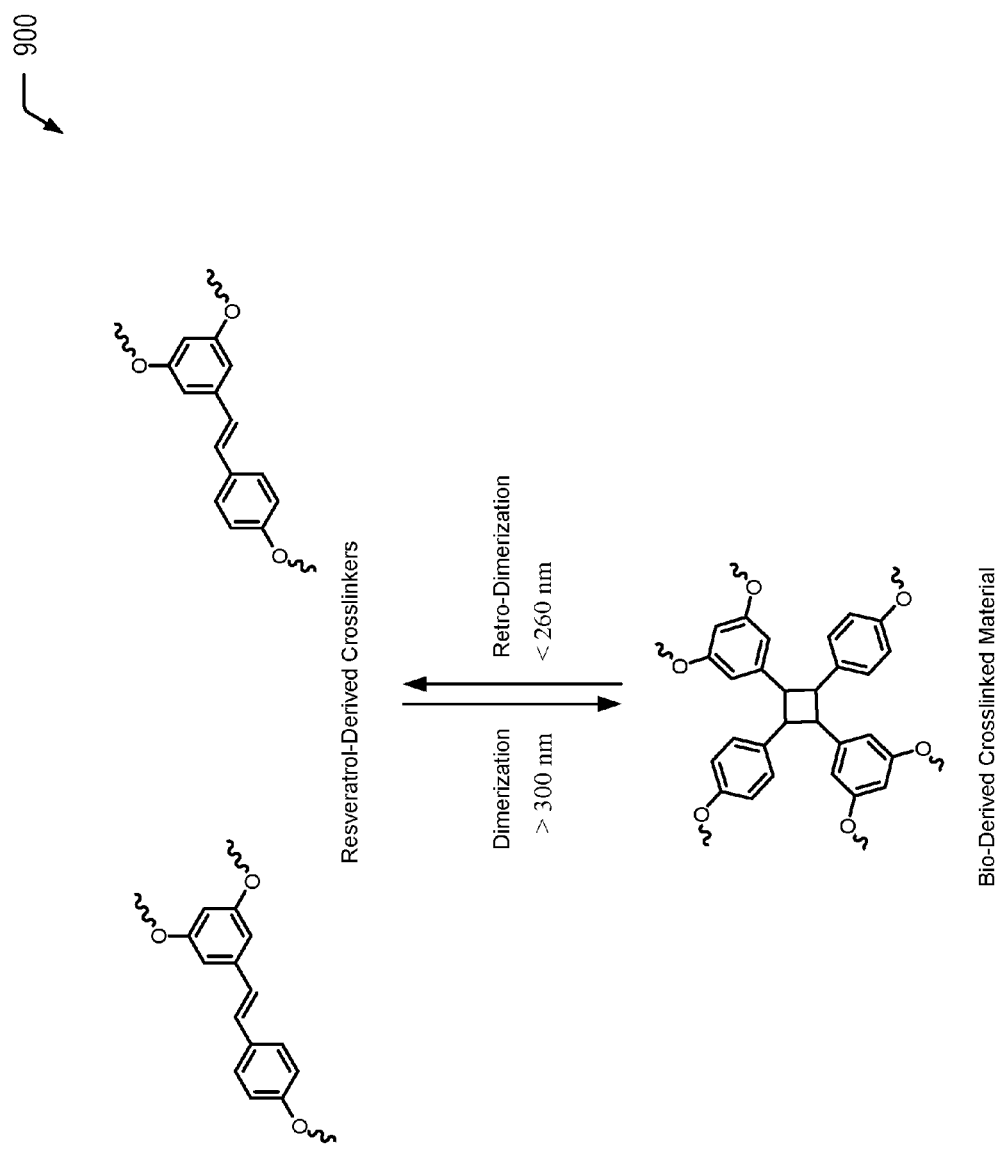
FIG. 9 is a chemical reaction diagram illustrating a process of utilizing the resveratrol-derived crosslinkers of the present disclosure to form a bio-derived crosslinked material via a reversible dimerization reaction, according to one embodiment.
Figure 10:
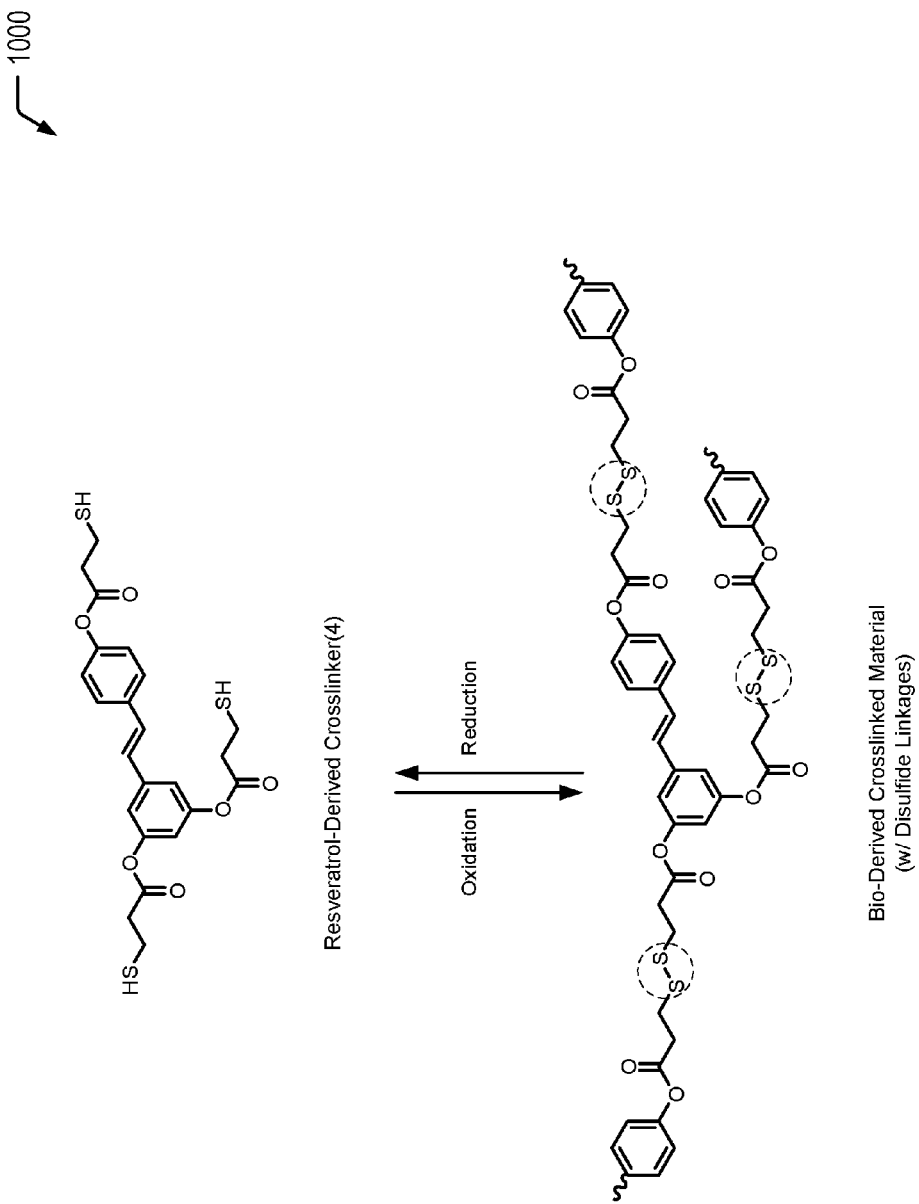
FIGS. 10 and 11 are chemical reaction diagrams illustrating that the resveratrol-derived crosslinkers of FIGS. 7 and 8 may be utilized to form bio-derived crosslinked materials with disulfide linkages, according to one embodiment.
Figure 11:
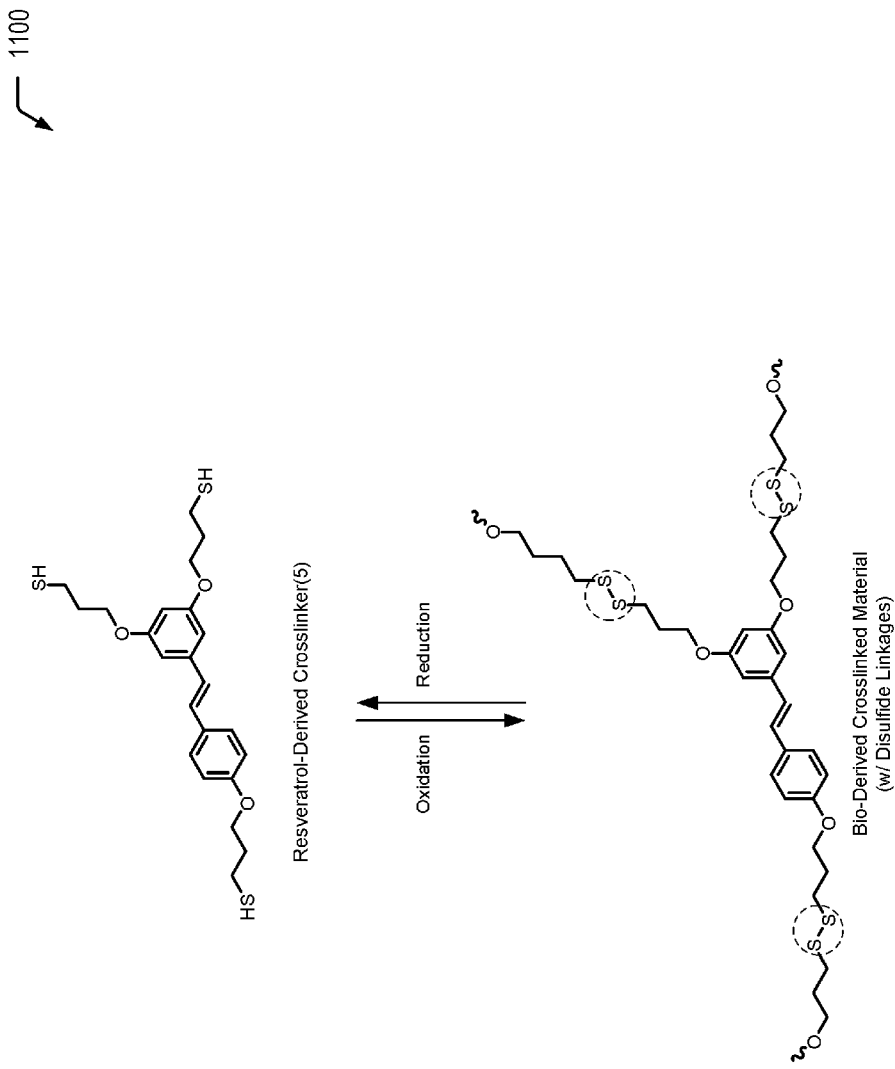
Figure 12:
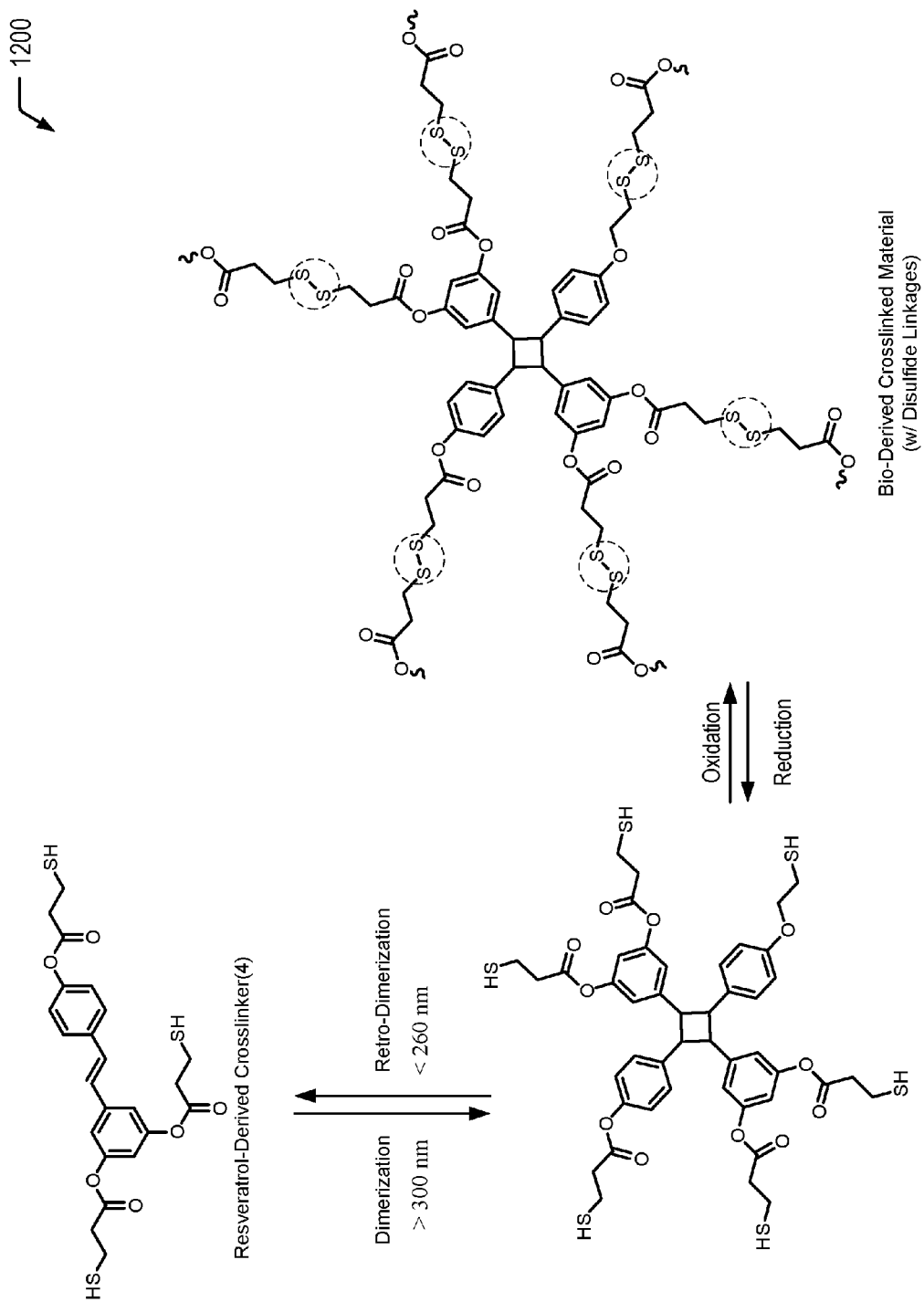
FIGS. 12 and 13 are chemical reaction diagrams illustrating that the resveratrol-derived crosslinkers of FIGS. 7 and 8 may be undergo a dimerization reaction and subsequent oxidation to form bio-derived crosslinked materials with disulfide linkages, according to one embodiment.
Figure 13:
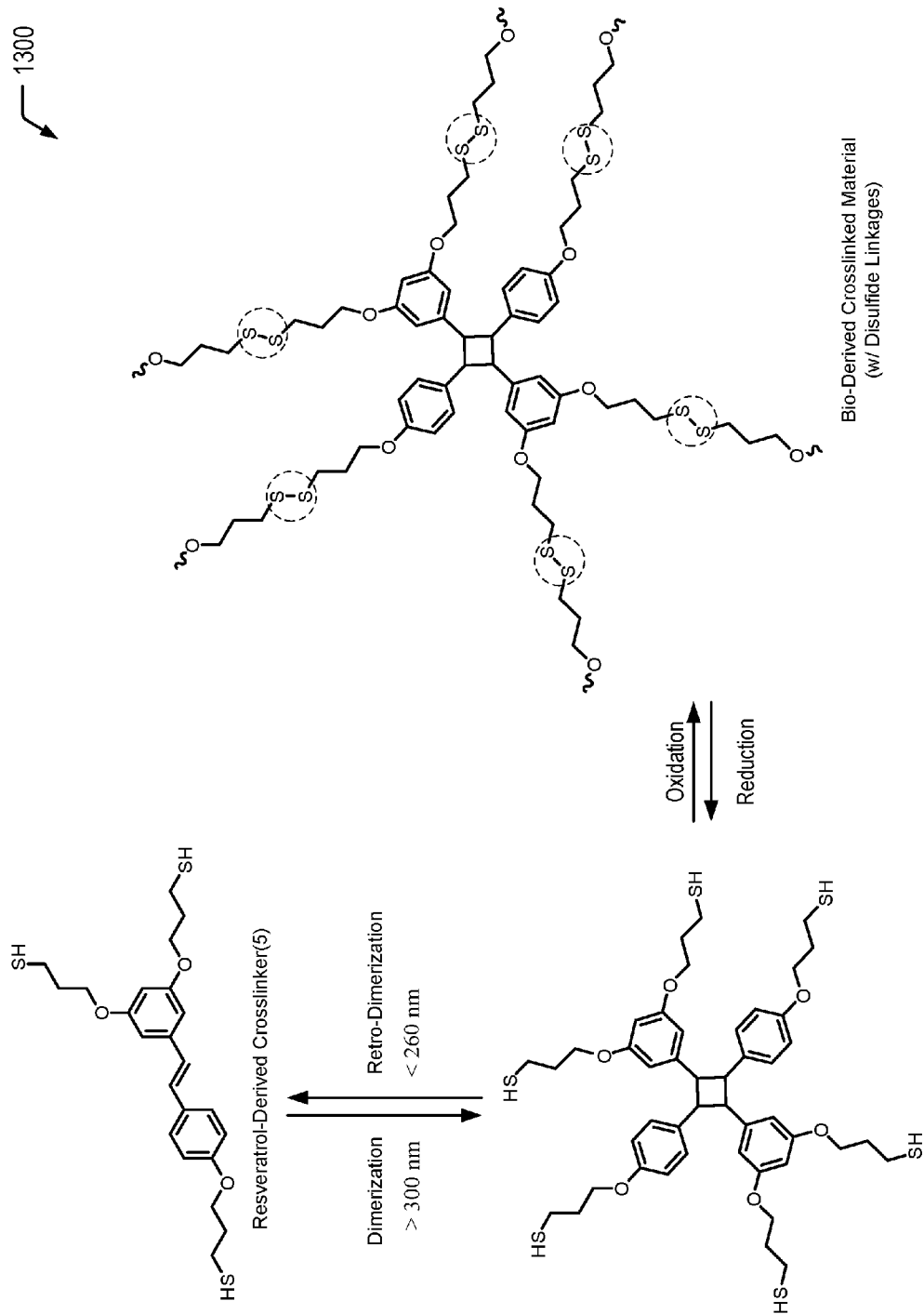

FIGS. 3 to 8 illustrate examples of resveratrol-derived crosslinkers that may be formed from the biorenewable molecule resveratrol. While FIGS. 3-8 illustrate that the resveratrol-derived crosslinkers may be utilized to form crosslinked PDMS materials, it will be appreciated that the resveratrol-derived materials may be utilized in alternative reactions. For example, FIG. 9 illustrates that the resveratrol-derived crosslinkers of the present disclosure may be utilized to form alternative bio-derived crosslinked materials via a dimerization reaction, enabling the degree of crosslinking to be further increased/decreased due to the ring opening/cyclobutane formation. As another example, FIGS. 10 and 11 illustrate that the resveratrol-derived crosslinkers of FIGS. 7 and 8 (that include multiple thiol/mercapto groups) may form alternative bio-derived crosslinked materials via an oxidation reaction that results in the formation of disulfide linkages. As yet another example, FIGS. 12 and 13 illustrate that the resveratrol-derived crosslinkers of FIGS. 7 and 8 (that include multiple thiol/mercapto groups) may undergo a dimerization reaction, followed by an oxidation reaction that results in the formation of disulfide linkages.

Figure 3:
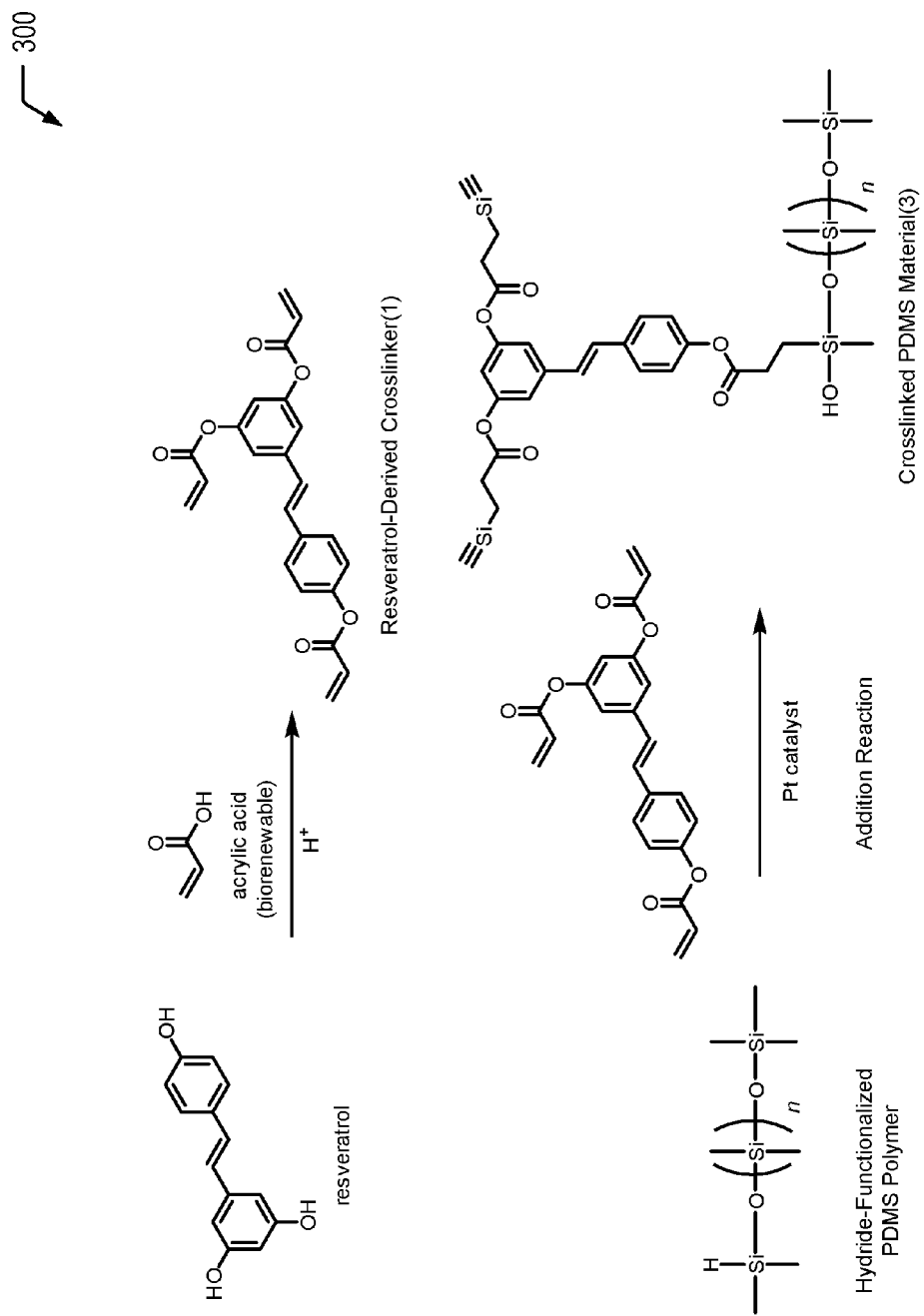
FIG. 3 is a chemical reaction diagram illustrating a process of forming a crosslinked PDMS material using a first bio-derived crosslinking material that is formed from the biorenewable molecule resveratrol, according to one embodiment.

Referring to FIG. 3, a chemical reaction diagram 300 illustrates a particular embodiment of a process of utilizing the biorenewable molecule resveratrol to form a resveratrol-derived crosslinker (identified as "Resveratrol-Derived Crosslinker(1)" in FIG. 3) that includes multiple vinyl groups. FIG. 3 further illustrates that the resveratrol-derived crosslinker may be utilized to form a crosslinked polymeric material (e.g., a crosslinked PDMS material), according to one embodiment.

The first chemical reaction depicted at the top of FIG. 3 illustrates that the resveratrol molecule may be reacted with acrylic acid via acid- (or base-) catalyzed condensation reaction to form a crosslinker with multiple vinyl groups. Alternatively, acryloyl chloride may be formed from the acrylic acid, and may be used in place of acrylic acid along with an amine which may be pyridine or triethylamine. The acrylic acid may be formed from biorenewable resource(s).

As a prophetic example, resveratrol (1 equiv.), acrylic acid (4.5-5.0 equiv.), catalytic p-toluenesulfonic acid (or other catalysts such as sulfonic acids, sulfuric acid, phosphoric acid, hydrogen sulfates, dihydrogen phosphates, phosphonic acid esters, or dialkyl tin dioxides) or a Lewis base such as dimethylaminopyridine (DMAP), and a suitable amount of toluene (or other water-azeotrope forming solvents) may be added to a reaction vessel and heated under azeotropic distillation conditions (e.g., refluxing using a Dean-Stark apparatus) until water is no longer removed from the reaction. The mixture may be cooled to room temperature, and the organic layer may be separated, rinsed with water, dried, and purified.

The second chemical reaction depicted at the bottom of FIG. 3 illustrates that the resveratrol-derived crosslinker may be utilized to form a crosslinked polymeric material. FIG. 3 illustrates a particular embodiment of an addition reaction that utilizes a platinum (Pt) catalyst. As a prophetic example, a hydride-functionalized siloxane may be blended with the first resveratrol-derived crosslinker having multiple vinyl groups (1-20% w/w) and Pt catalyst, such as Speier's catalyst ($H_2PtCl_6$) or Karstedt's catalyst ($C_{24}H_{54}O_3Pt_2Si_6$), and are then mixed. An addition cure reaction via hydrosilation may be performed on the mixture.

FIG. 3 depicts an example in which all three vinyl groups of the resveratrol-derived crosslinker react in the addition reaction. Depending on the reaction conditions, all three vinyl groups may be used to crosslink the PDMS polymer or less than three vinyl groups may be used for crosslinking. To illustrate, by controlling the reaction conditions, catalyst type (other tin or platinum catalyst may be used), catalyst loading, and stoichiometry, a fraction of the vinyl groups can be used for PDMS crosslinking. The ability to control the number of vinyl groups that react may enable better control of the mechanical properties of the final polymer.

Thus, FIG. 3 illustrates an example of a process of forming a bio-derived crosslinker having multiple vinyl groups from the biorenewable molecule resveratrol and utilizing the resveratrol-derived crosslinker to form a crosslinked polymeric material. The resveratrol-derived crosslinker may be used to increase the biorenewable content of a resulting crosslinked polymeric material (e.g., a crosslinked PDMS material).

Figure 4:
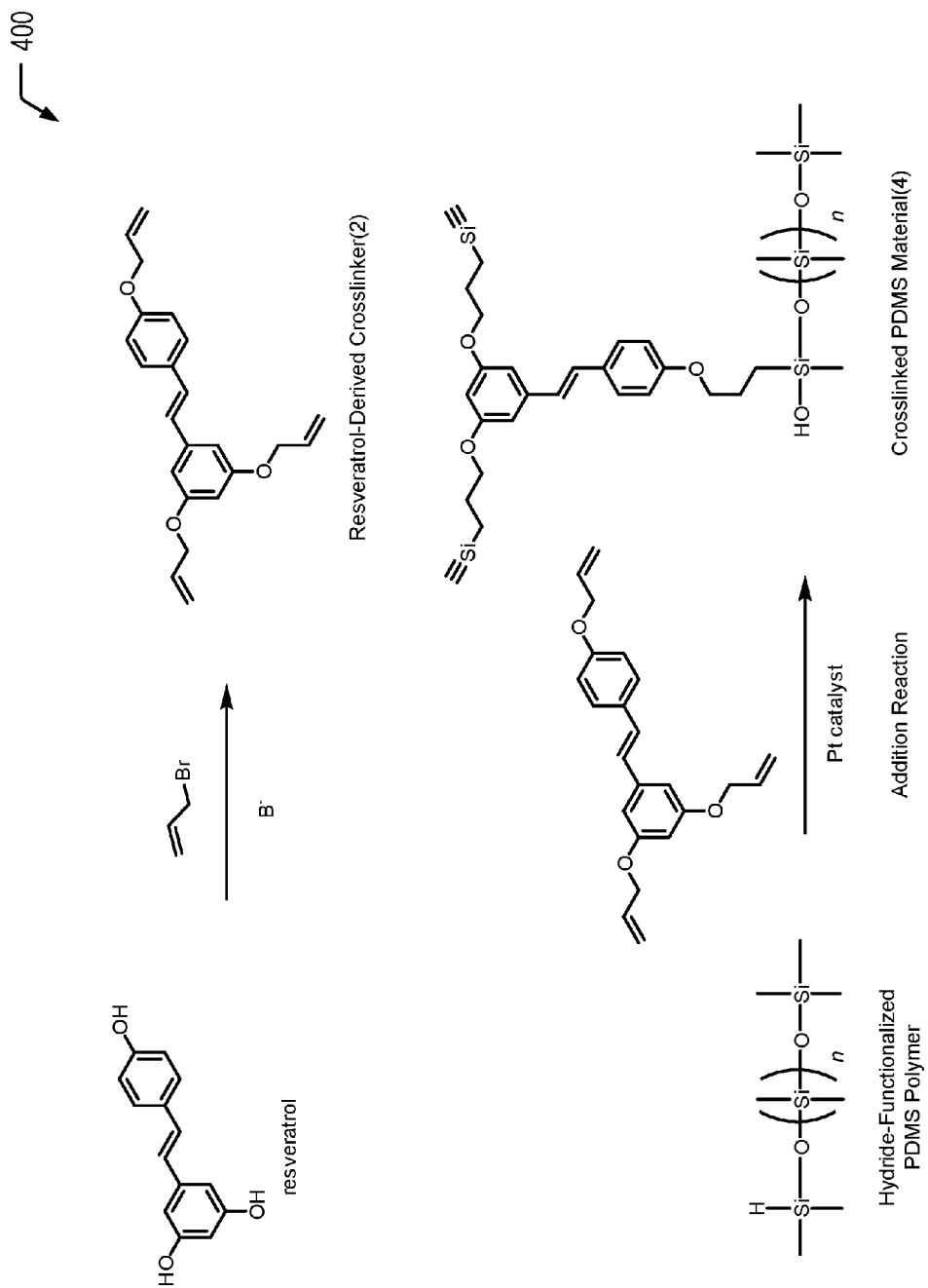
FIG. 4 is a chemical reaction diagram illustrating a process of forming a crosslinked PDMS material using a second bio-derived crosslinking material that is formed from the biorenewable molecule resveratrol, according to one embodiment.

Referring to FIG. 4, a chemical reaction diagram 400 illustrates a particular embodiment of a process of utilizing the biorenewable resveratrol molecule to form a second resveratrol-derived crosslinker (identified as "Resveratrol-Derived Crosslinker(2)" in FIG. 4) that includes multiple vinyl groups. FIG. 4 further illustrates that the second resveratrol-derived crosslinker may be utilized to form a crosslinked polymeric material (e.g., a crosslinked PDMS material), according to one embodiment.

The first chemical reaction depicted at the top of FIG. 4 illustrates that the biorenewable resveratrol molecule may be reacted with allyl bromide via a substitution reaction to form a crosslinker with multiple vinyl groups (that is different from the resveratrol-derived crosslinker with multiple vinyl groups shown in FIG. 3). In some cases, the allyl bromide may be synthesized in one step from a biorenewable allyl alcohol.

As a prophetic example, resveratrol may be added to a suspension or solution of a base (e.g., sodium hydride) in an organic solvent, such as tetrahydrofuran (THF) or diethyl ether, at 0° C. The reaction mixture may be stirred for 30 minutes before adding allyl bromide (>3 equiv.), dropwise. The reaction mixture may be stirred for approximately 3 hours and then neutralized by hydrochloric (HCl) acid. The aqueous and organic layers may then be separated. The aqueous layer may be extracted with diethyl ether and rinsed with brine. The organic layer may be dried over magnesium sulfate ($MgSO_4$) and the solvent may be removed in vacuo. The residue is purified by distillation or column chromatography.

The second chemical reaction depicted at the bottom of FIG. 4 illustrates that the second resveratrol-derived crosslinker may be utilized to form a crosslinked polymeric material. FIG. 4 illustrates a particular embodiment of an addition reaction that utilizes a platinum (Pt) catalyst. As a prophetic example, a hydride-functionalized siloxane may be blended with the second resveratrol-derived crosslinker having multiple vinyl groups (1-20% w/w) and Pt catalyst, such as Speier's catalyst ($H_2PtCl_6$) or Karstedt's catalyst ($C_{24}H_{54}O_3Pt_2Si_6$), and are then mixed. An addition cure reaction via hydrosilation may be performed on the mixture.

FIG. 4 depicts an example in which all three vinyl groups of the second resveratrol-derived crosslinker react in the addition reaction. Depending on the reaction conditions, all three vinyl groups may be used to crosslink the PDMS polymer or less than three vinyl groups may be used for crosslinking. To illustrate, by controlling the reaction conditions, catalyst type (other tin or platinum catalyst may be used), catalyst loading, and stoichiometry, a fraction of the vinyl groups can be used for PDMS crosslinking. The ability to control the number of vinyl groups that react may enable better control of the mechanical properties of the final polymer.

Thus, FIG. 4 illustrates an example of a process of forming a resveratrol-derived crosslinker having multiple vinyl groups from the biorenewable molecule resveratrol and utilizing the resveratrol-derived crosslinker to form a crosslinked polymeric material via an addition reaction. The resveratrol-derived crosslinker may be used to increase the biorenewable content of a resulting crosslinked polymeric material (e.g., a crosslinked PDMS material).

Figure 5:
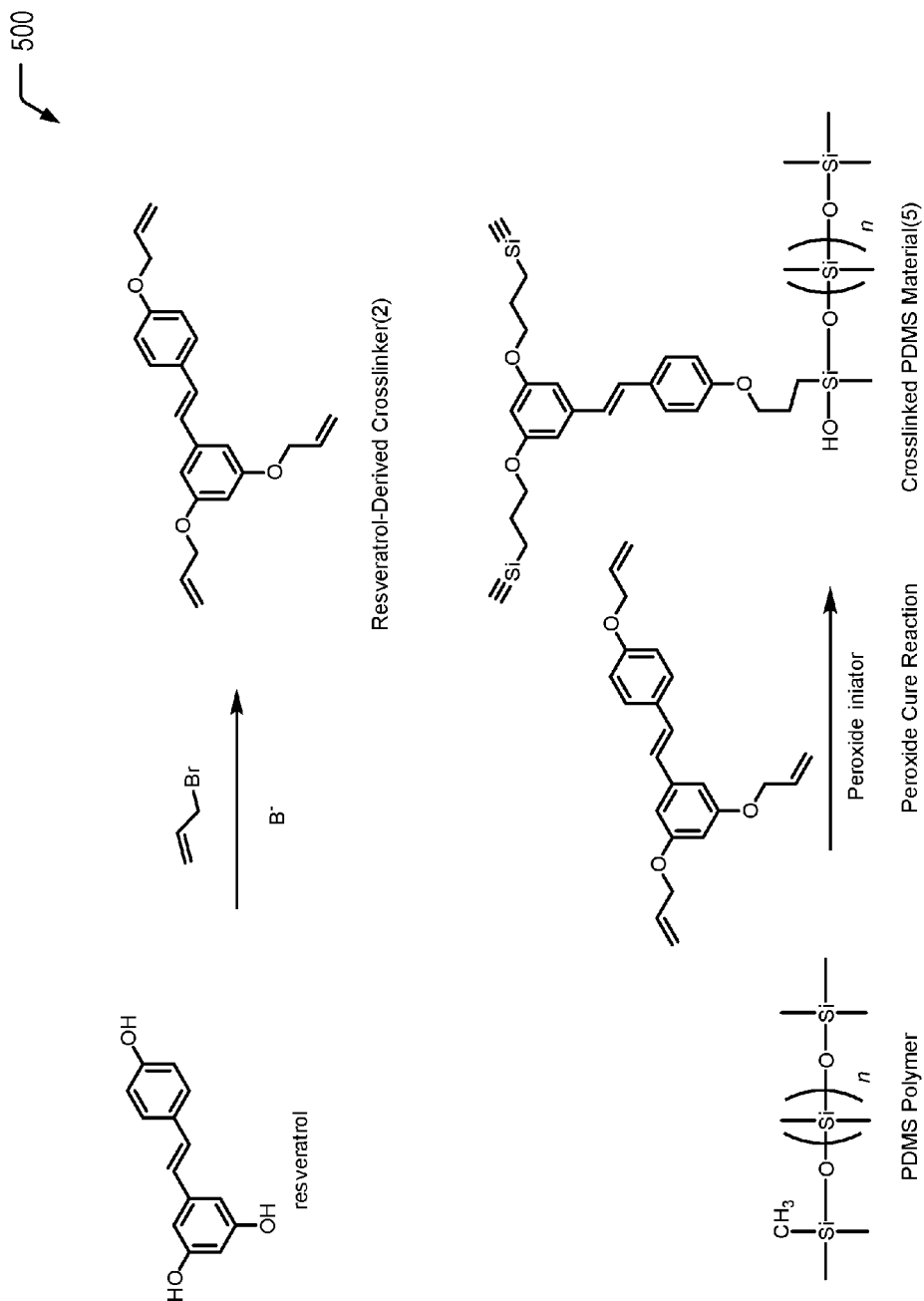
FIG. 5 is a chemical reaction diagram illustrating a process of forming a crosslinked PDMS material using the second bio-derived crosslinking material of FIG. 4, according to one embodiment.

Referring to FIG. 5, a chemical reaction diagram 500 illustrates a particular embodiment of a process of utilizing the second resveratrol-derived crosslinker having multiple vinyl groups of FIG. 4 to form a crosslinked polymeric material (e.g., a crosslinked PDMS material) via a peroxide cure reaction.

The second chemical reaction depicted at the bottom of FIG. 5 illustrates that the second resveratrol-derived crosslinker may be utilized to form a crosslinked polymeric material via a radical cure reaction using a peroxide initiator. As a prophetic example, a Si—$CH_3$ functional siloxane may be blended with the second resveratrol-derived crosslinker having multiple vinyl groups (1-20% w/w) and catalyst (e.g., benzoyl peroxide, 0.2%-1.0% w/w) and mixed. The mixture may be applied to molds or coated onto a substrate and cured for times and temperatures (e.g., 140-160° C., with a post cure of 25-30° C. higher than the initial reaction temperature to remove volatile peroxides) that are appropriate for the desired applications.

FIG. 5 depicts an example in which all three vinyl groups of the second resveratrol-derived crosslinker react in the peroxide cure reaction. Depending on the reaction conditions, all three vinyl groups may be used to crosslink the PDMS polymer or less than three vinyl groups may be used for crosslinking. To illustrate, by controlling the reaction conditions, catalyst type, catalyst loading, and stoichiometry, a fraction of the vinyl groups can be used for PDMS crosslinking. The ability to control the number of vinyl groups that react may enable better control of the mechanical properties of the final polymer.

Thus, FIG. 5 illustrates an example of a process of forming a bio-derived crosslinker having multiple vinyl groups from the biorenewable molecule resveratrol and utilizing the bio-derived crosslinker to form a crosslinked polymeric material via a peroxide cure reaction. The bio-derived crosslinker may be used to increase the biorenewable content of a resulting crosslinked polymeric material (e.g., a crosslinked PDMS material).

Figure 6:
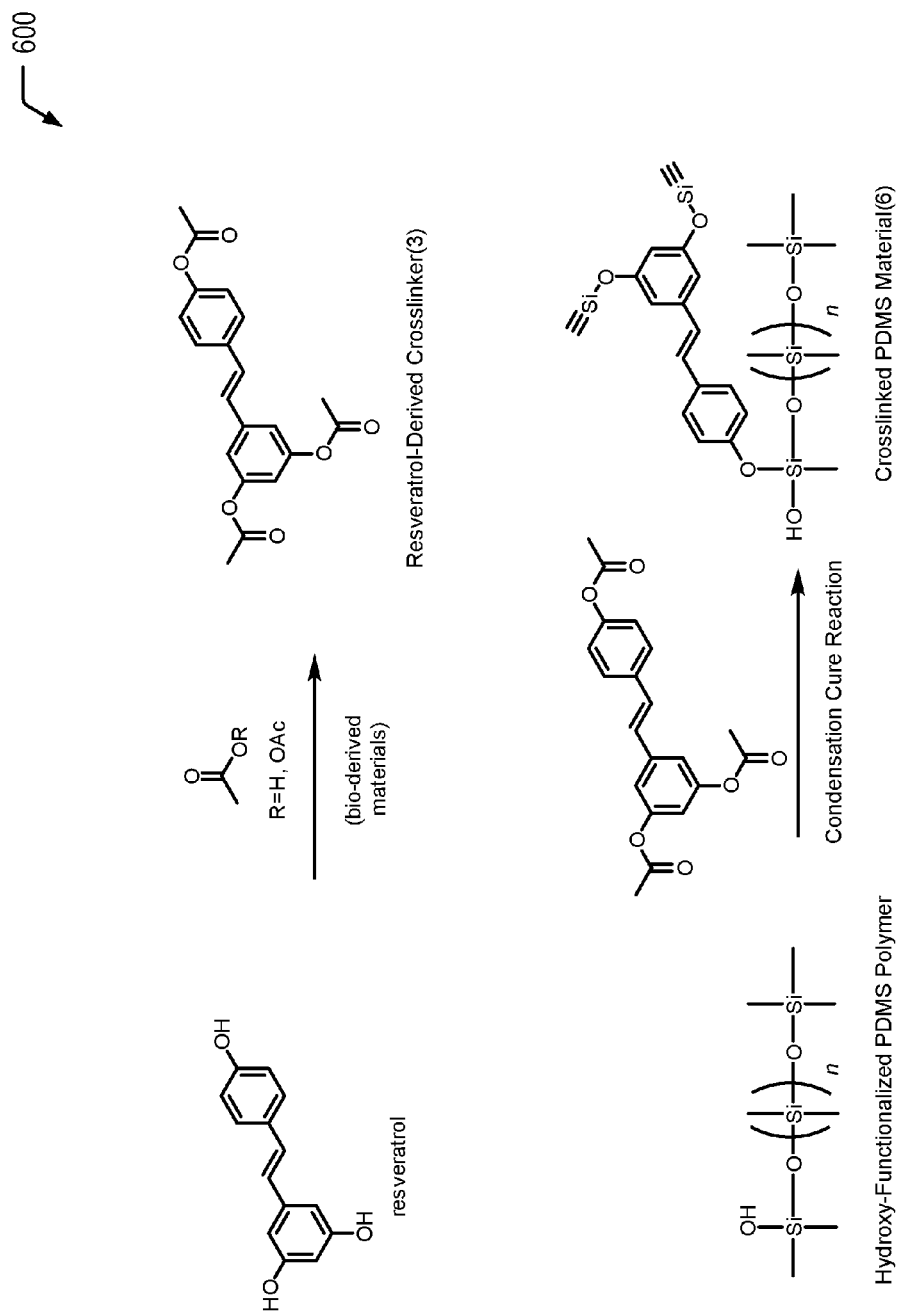
FIG. 6 is a chemical reaction diagram illustrating a process of forming a crosslinked PDMS material using a third bio-derived crosslinking material that is formed from the biorenewable molecule resveratrol, according to one embodiment.

Referring to FIG. 6, a chemical reaction diagram 600 illustrates a particular embodiment of a process of utilizing the biorenewable resveratrol molecule to form a third resveratrol-derived crosslinker (identified as "Resveratrol-Derived Crosslinker(3)" in FIG. 6) that includes multiple acetate groups. FIG. 6 further illustrates that the resveratrol-derived crosslinker may be utilized to form a crosslinked polymeric material (e.g., a crosslinked PDMS material), according to one embodiment.

The first chemical reaction depicted at the top of FIG. 6 illustrates that the biorenewable resveratrol molecule may be reacted with acetic acid or acetic anhydride via an acylation reaction to form a crosslinker that includes multiple acetate groups. Alternatively, acetyl chloride may be formed from the acetic acid or purchased from a commercial source, and may be used in place of acetic acid along with an amine which may be pyridine or triethylamine. The acetic acid may be obtained from renewable sources, and acetic anhydride can be synthesized from acetic acid.

As a prophetic example, resveratrol (1 equiv.), acetic acid (4.5-5.0 equiv.), catalytic p-toluenesulfonic acid (or other catalysts such as sulfonic acids, sulfuric acid, phosphoric acid, hydrogen sulfates, dihydrogen phosphates, phosphonic acid esters, or dialkyl tin dioxides) or a Lewis base such as dimethylaminopyridine (DMAP), and a suitable amount of toluene (or other water-azeotrope forming solvents) may be added to a reaction vessel and heated under azeotropic distillation conditions (e.g., refluxing using a Dean-Stark apparatus) until water is no longer removed from the reaction. The mixture may be cooled to room temperature, and the organic layer may be separated, rinsed with water, dried, and purified.

The second chemical reaction depicted at the bottom of FIG. 6 illustrates that the third resveratrol-derived crosslinker having multiple acetate groups may be utilized to form a crosslinked polymeric material via a condensation cure reaction. As a prophetic example, a hydroxy-functionalized siloxane may be mixed with the third resveratrol-derived crosslinker having multiple acetate groups (1-50% w/w) and blended with exclusion of moisture. The blended mixture may be stored under moisture-free conditions. The blended mixture may be applied to surfaces and materials and allowed to cure under atmospheric conditions.

FIG. 6 depicts an example in which all three acetate groups of the third resveratrol-derived crosslinker react in the addition reaction. Depending on the reaction conditions, all three acetate groups may be used to crosslink the PDMS polymer or less than three acetate groups may be used for crosslinking. The ability to control the number of acetate groups that react may enable better control of the mechanical properties of the final polymer.

Thus, FIG. 6 illustrates an example of a process of forming a bio-derived crosslinker having multiple acetate groups from the biorenewable molecule resveratrol and utilizing the bio-derived crosslinker to form a crosslinked polymeric material via a condensation cure reaction. The bio-derived crosslinker may be used to increase the biorenewable content of a resulting crosslinked polymeric material (e.g., a crosslinked PDMS material).

Figure 7:
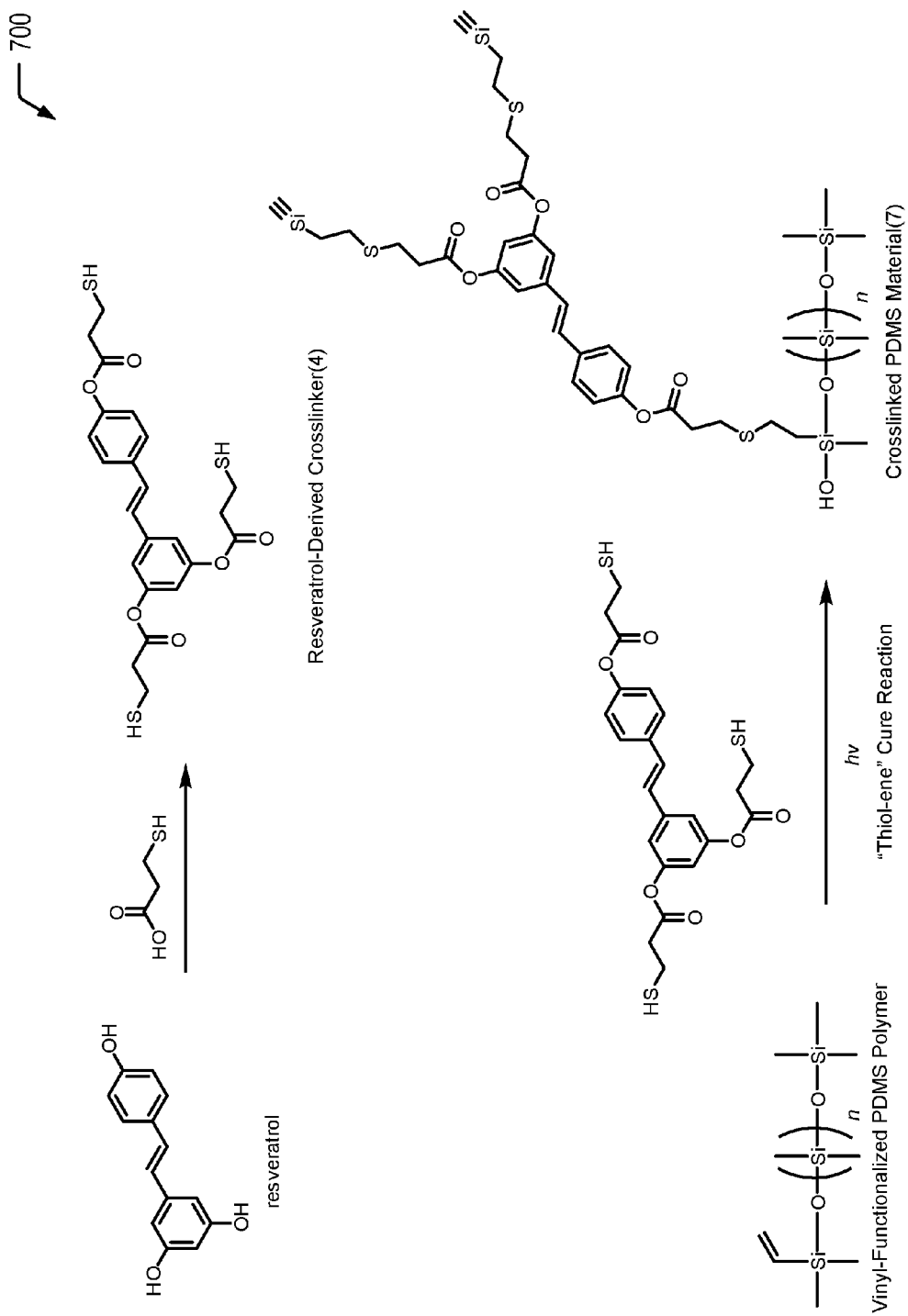
FIG. 7 is a chemical reaction diagram illustrating a process of forming a crosslinked PDMS material using a fourth bio-derived crosslinking material that is formed from the biorenewable molecule resveratrol, according to one embodiment.

Referring to FIG. 7, a chemical reaction diagram 700 illustrates a particular embodiment of a process of utilizing the biorenewable resveratrol molecule to form a fourth resveratrol-derived crosslinker (identified as "Resveratrol-Derived Crosslinker(4)" in FIG. 7) that includes multiple thiol (or mercapto) groups. FIG. 7 further illustrates that the resveratrol-derived crosslinker may be utilized to form a crosslinked polymeric material (e.g., a crosslinked PDMS material), according to one embodiment.

The first chemical reaction depicted at the top of FIG. 7 illustrates that the biorenewable resveratrol molecule may be reacted with ethyl mercaptoacetic acid via a condensation reaction (acid/base promoted) to synthesize a crosslinker with multiple thiol (or mercapato) groups. The ethyl mercaptoacetic acid may be synthesized from biorenewable acrylic acid via subsequent halogenation and substitution reactions.

As a prophetic example, resveratrol (1 equiv.), 3-mercaptopropionic acid (4.5-5.0 equiv.), catalytic p-toluenesulfonic acid (or other catalysts such as sulfonic acids, triflic acid, sulfuric acid, phosphoric acid, hydrogen sulfates, dihydrogen phosphates, phosphonic acid esters, or dialkyl tin dioxides) or a Lewis base such as dimethylaminopyridine (DMAP), 1,8-Diazabicyclo[5.4.0]undec-7-ene (DBU), or triphenylphosphine, and a suitable amount of toluene (or other water-azeotrope forming solvents) may be added to a reaction vessel and heated under azeotropic distillation conditions (e.g., refluxing using a Dean-Stark apparatus) until water is no longer removed from the reaction. The mixture may be cooled to room temperature, and the organic layer may be separated, rinsed with water, dried, and purified.

The second chemical reaction depicted at the bottom of FIG. 7 illustrates that the fourth resveratrol-derived crosslinker may be utilized to form a crosslinked polymeric material via a thiol-ene cure reaction. As a prophetic example, the fourth resveratrol-derived crosslinker having multiple thiol groups (2-6% w/w) may be mixed with a vinyl-functionalized siloxane. The mixture may include a radical initiator, such as a Micheler's ketone, an alpha-amino-ketone, an alpha-hydroxy-ketone, a benzyldimethyl ketal, or benzophenone (among other alternatives). The mixture may be applied to molds or coated onto a substrate and cured under UV light at a time and temperature suitable to the included radical initiators that are appropriate for the desired applications.

FIG. 7 depicts an example in which all three thiol groups of the fourth resveratrol-derived crosslinker react in the thiol-ene cure reaction. Depending on the reaction conditions, all three thiol groups may be used to crosslink the PDMS polymer or less than three thiol groups may be used for crosslinking. The ability to control the number of thiol groups that react may enable better control of the mechanical properties of the final polymer.

Thus, FIG. 7 illustrates an example of a process of forming a bio-derived crosslinker having multiple thiol (or mercapto) groups from the biorenewable molecule resveratrol and utilizing the bio-derived crosslinker to form a crosslinked polymeric material via a thiol-ene cure reaction. The bio-derived crosslinker may be used to increase the biorenewable content of a resulting crosslinked polymeric material (e.g., a crosslinked PDMS material).

Figure 8:
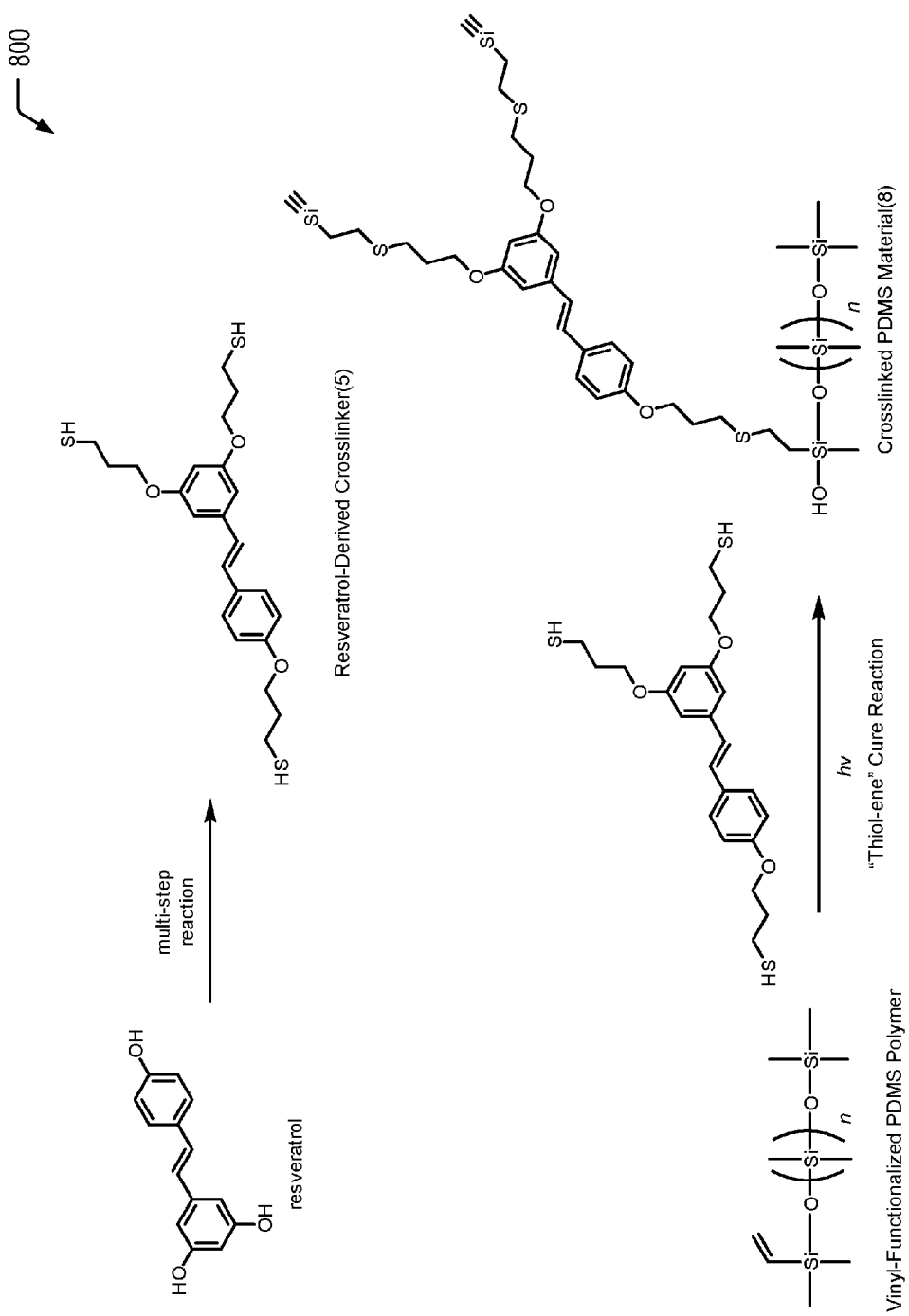
FIG. 8 is a chemical reaction diagram illustrating a process of forming a crosslinked PDMS material using a fifth bio-derived crosslinking material that is formed from the biorenewable molecule resveratrol, according to one embodiment.

Referring to FIG. 8, a chemical reaction diagram 800 illustrates a particular embodiment of a process of utilizing the biorenewable resveratrol molecule to form a fifth resveratrol-derived crosslinker (identified as "Resveratrol-Derived Crosslinker(5)" in FIG. 8) that includes multiple thiol (or mercapto) groups. FIG. 8 further illustrates that the bio-derived crosslinker may be utilized to form a crosslinked polymeric material (e.g., a crosslinked PDMS material), according to one embodiment.

The first chemical reaction depicted at the top of FIG. 8 illustrates that the biorenewable resveratrol molecule may be utilized to form a crosslinker with multiple thiol (or mercapto) groups via a multiple step reaction that includes the use of an acetate protected thiol bromopropane (commercially available) and substitution chemistry, then removing the protecting group. As a prophetic example, resveratrol may be added to a suspension or solution of a base (e.g., sodium hydride) in an organic solvent, such as tetrahydrofuran (THF), diethyl ether, or N,N-dimethylformamide (DMF) at 0° C. The reaction mixture may be stirred for 30 minutes before adding S-(3-bromopropyl)ethanethioic acid ester (>3 equiv.), dropwise. The reaction mixture may be stirred for approximately 3 hours, and then neutralized by hydrochloric (HCl) acid. The aqueous and organic layers may then be separated. The aqueous layer may be extracted with diethyl ether, and rinsed with brine. The organic layer may be dried over magnesium sulfate ($MgSO_4$), and the solvent may be removed in vacuo. The residue may be purified by distillation or column chromatography. The resultant product may be dissolved in DCM at 0° C. and an acid such as trifluoroacetic acid may be added, dropwise. The reaction may be stirred for 3 hours at room temperature, and poured into water. The aqueous and organic layers may then be separated. The aqueous layer may then be extracted with diethyl ether, and rinsed with brine. The organic layer may be dried over magnesium sulfate ($MgSO_4$), and the solvent may be removed in vacuo. The residue is purified by distillation or column chromatography.

The second chemical reaction depicted at the bottom of FIG. 8 illustrates that the fifth resveratrol-derived crosslinker may be utilized to form a crosslinked polymeric material via a thiol-ene cure reaction. As a prophetic example, the fifth resveratrol-derived crosslinker having multiple thiol groups (2-6% w/w) may be mixed with a vinyl-functionalized siloxane. The mixture may include a radical initiator, such as a Micheler's ketone, an alpha-amino-ketone, an alpha-hydroxy-ketone, a benzyldimethyl ketal, or benzophenone (among other alternatives). The mixture may be applied to molds or coated onto a substrate and cured under UV light at a time and temperature suitable to the included radical initiators that are appropriate for the desired applications.

FIG. 8 depicts an example in which all three thiol groups of the fifth resveratrol-derived crosslinker react in the thiol-ene cure reaction. Depending on the reaction conditions, all three thiol groups may be used to crosslink the PDMS polymer or less than three thiol groups may be used for crosslinking. The ability to control the number of thiol groups that react may enable better control of the mechanical properties of the final polymer.

Thus, FIG. 8 illustrates an example of a process of forming a bio-derived crosslinker having multiple thiol (or mercapto) groups from the biorenewable molecule resveratrol and utilizing the bio-derived crosslinker to form a crosslinked polymeric material via a thiol-ene cure reaction. The bio-derived crosslinker may be used to increase the biorenewable content of a resulting crosslinked polymeric material (e.g., a crosslinked PDMS material).

Referring to FIG. 9, a chemical reaction diagram 900 illustrates that the resveratrol-derived crosslinkers of the present disclosure may undergo a dimerization reaction to form a bio-derived crosslinked material, according to one embodiment. FIG. 9 illustrates that the dimerization reaction results in formation of a cyclobutane ring. FIG. 9 further illustrates that the dimerization reaction is a reversible reaction. To illustrate, the dimerization reaction may result from exposure to light having a wavelength of greater than 300 nm, while exposure to ultraviolet light having a wavelength of less than 260 nm may result in a retro-dimerization reaction. It will be appreciated that FIG. 9 depicts selected portions of the resveratrol-derived crosslinkers and the bio-derived crosslinked material for ease of illustration purposes only. In some cases, each of the resveratrol-derived crosslinkers depicted in FIG. 9 may correspond to one of the resveratrol-derived crosslinkers depicted in FIGS. 3-8. In other cases, the resveratrol-derived crosslinkers depicted in FIG. 9 may include various combinations of the resveratrol-derived crosslinkers depicted in FIGS. 3-8. Further, in some cases, the resveratrol-derived crosslinkers depicted in FIG. 9 may include a combination of resveratrol and one or more of the resveratrol-derived crosslinkers depicted in FIGS. 3-8.

FIGS. 10 and 11 are chemical reaction diagrams 1000, 1100 illustrating that the resveratrol-derived crosslinkers of FIGS. 7 and 8 (that include multiple thiol/mercapto groups) may be joined together to form a polymeric network of disulfide bonds, according to one embodiment. In the examples depicted in FIGS. 10 and 11, the resveratrol-derived crosslinkers of FIGS. 7 and 8 may undergo an oxidation-reduction reaction to form multiple disulfide linkages.

FIGS. 12 and 13 are chemical reaction diagrams 1200, 1300 illustrating that the resveratrol-derived cross-linkers of FIGS. 7 and 8 may be undergo a dimerization reaction and subsequent oxidation to form bio-derived crosslinked materials with disulfide linkages, according to one embodiment.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A process comprising utilizing biorenewable resveratrol or a resveratrol-derived material as a bio-derived crosslinker to form a crosslinked polydimethylsiloxane (PDMS) material.

2. The process of claim 1, wherein the resveratrol-derived material is utilized as the bio-derived crosslinker, the process further comprising forming the resveratrol-derived material from biorenewable resveratrol.

3. The process of claim 1, wherein the crosslinked PDMS material is formed via a chemical reaction of a functionalized PDMS material and the bio-derived crosslinker.

4. The process of claim 3, wherein the functionalized PDMS material includes a hydride-functionalized PDMS material, and wherein the chemical reaction includes a condensation cure reaction using dibutyltin dilaurate (DBDTL) as a catalyst.

5. The process of claim 3, wherein the functionalized PDMS material includes an alkoxy-functionalized PDMS material, and wherein the chemical reaction includes a condensation cure reaction using dibutyltin dilaurate (DBDTL) as a catalyst.

6. The process of claim 5, wherein the alkoxy-functionalized PDMS material includes a methoxy-functionalized PDMS material.

7. The process of claim 1, wherein the resveratrol-derived material is utilized as the bio-derived crosslinker, and wherein the bio-derived crosslinker includes multiple acrylate groups.

8. The process of claim 1, wherein the resveratrol-derived material is utilized as the bio-derived crosslinker, and wherein the bio-derived crosslinker includes multiple vinyl groups.

9. The process of claim 1, wherein the resveratrol-derived material is utilized as the bio-derived crosslinker, and wherein the bio-derived crosslinker includes multiple acetate groups.

10. The process of claim 1, wherein the resveratrol-derived material is utilized as the bio-derived crosslinker, and wherein the bio-derived crosslinker includes multiple thiol groups.

11. A crosslinked polydimethylsiloxane (PDMS) material formed by a process that comprises chemically reacting a functionalized PDMS material with biorenewable resveratrol or a resveratrol-derived material.

12. The crosslinked PDMS material of claim 11, wherein the functionalized PDMS material includes a hydride-functionalized PDMS material or an alkoxy-functionalized PDMS material.

13. The crosslinked PDMS material of claim 11, wherein the bio-derived crosslinker includes multiple acrylate groups.

14. The crosslinked PDMS material of claim 11, wherein the bio-derived crosslinker includes multiple vinyl groups.

15. The crosslinked PDMS material of claim 11, wherein the bio-derived crosslinker includes multiple acetate groups.

16. The crosslinked PDMS material of claim 11, wherein the bio-derived crosslinker includes multiple thiol groups.

17. A process comprising utilizing a resveratrol-derived material that includes multiple thiol groups as a bio-derived crosslinker to form a crosslinked polymeric material that includes multiple disulfide linkages.

18. The process of claim 17, wherein the bio-derived crosslinker has the following chemical structure:

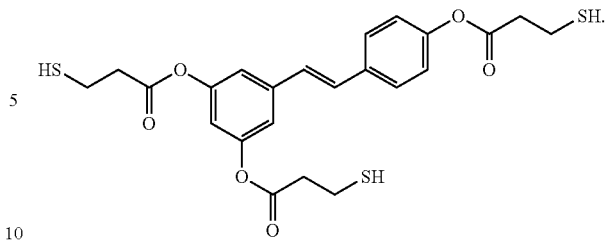

19. The process of claim 17, wherein the bio-derived crosslinker has the following chemical structure:

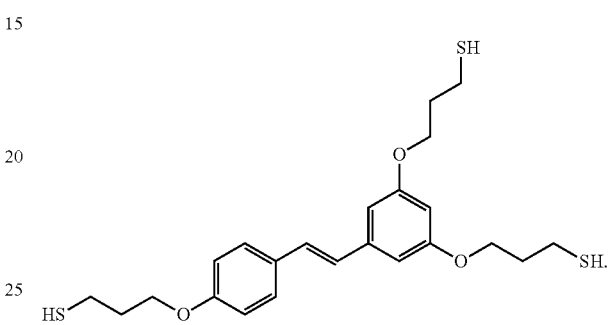

* * * * *